Oct. 1, 1935.    T. D. OWLER ET AL    2,016,119
CAR SEAT MECHANISM
Filed July 11, 1930    2 Sheets-Sheet 2
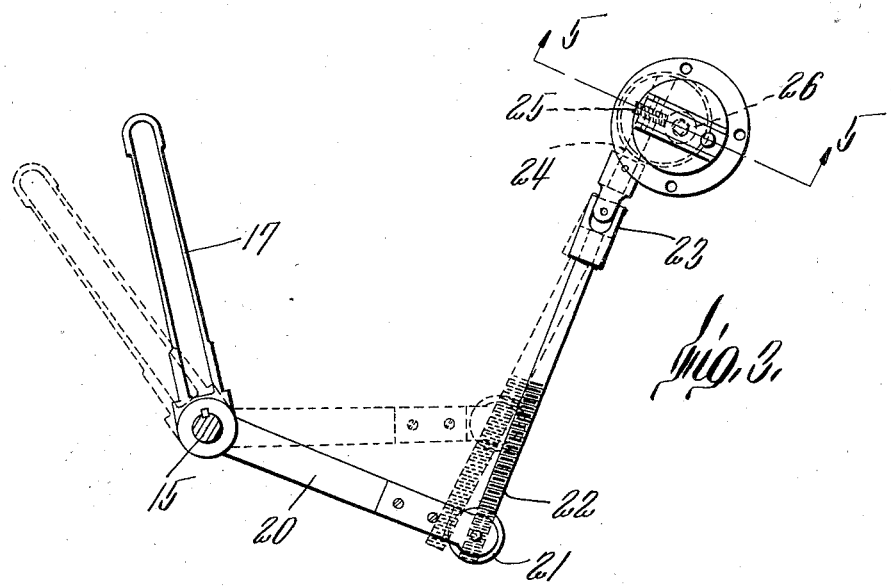
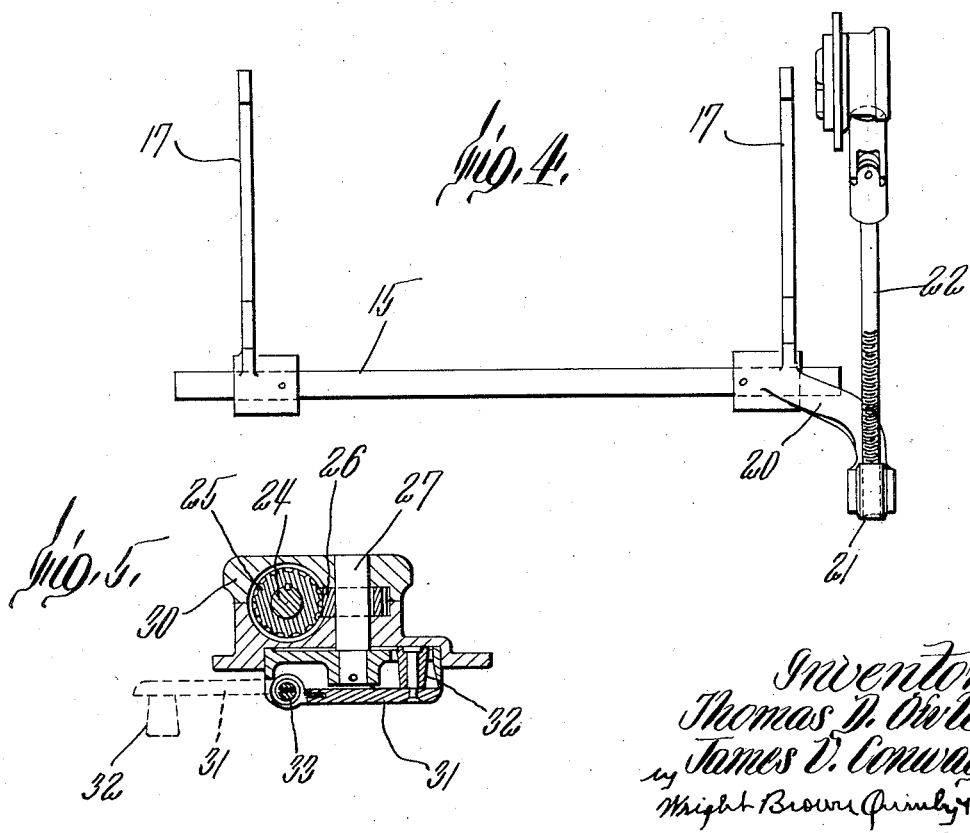
Inventors
Thomas D. Owler
James V. Conway
by Wright, Brown, Quinby & May
Attys Patented Oct. 1, 1935

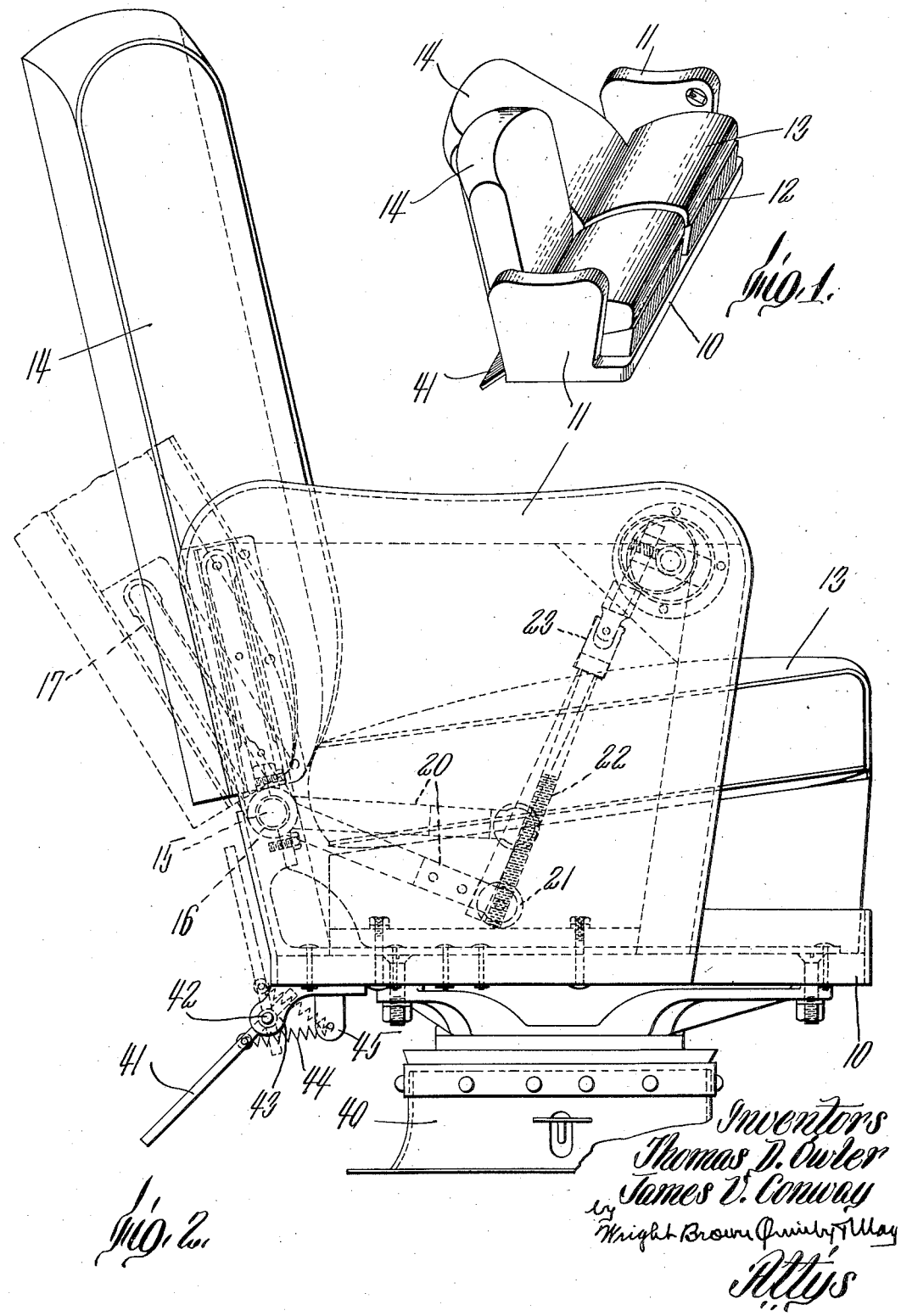

2,016,119

UNITED STATES PATENT OFFICE 2,016,119

CAR SEAT MECHANISM

Thomas D. Owler and James V. Conway, Chicago, Ill., assignors to Heywood-Wakefield Company, Boston, Mass., a corporation of Massachusetts Application July 11, 1930, Serial No. 467,268

3 Claims. (Cl. 155—163)

This invention relates to mechanism for adjusting the angle of a seat back.

The object of the invention is to provide mechanism adapted for use with seats having hinged backs, as, for example, car or bus seats, and by which the angle of the seat back may be easily and conveniently adjusted, a crank handle being mounted for this purpose adjacent to the outer end of an arm rest associated with the seat. It is apparent that although the invention is described and illustrated as applied to a car seat, it can be used with seats of any kind having a hinged back and an arm rest.

For a more complete understanding of the invention reference may be had to the description thereof which follows and to the drawings of which,—

Figure 1 is a perspective view of a double car seat in which the invention may be used.

Figure 2 is a side elevation, on a larger scale, of a car seat such as is illustrated in Figure 1.

Figure 3 is a side elevation of the mechanism for adjusting the seat back.

Figure 4 is a front elevation of the same.

Figure 5 is a section on the line 5—5 of Figure 3.

As shown in Figure 1, the invention may be applied to a double seat such as is frequently employed in railroad cars and in passenger buses, as well as to single seats. A car seat is illustrated on the drawings, this seat comprising a foundation or bottom frame 10 from each end of which rises an arm rest 11. Individual sets of springs 12 may rest on the frame 10, suitable cushions 13 being supported on the springs 12. With each individual cushion 13 is a seat back 14 which, according to the invention, may be adjusted to any angle within its range of swing. To this end the seat backs 14 are each mounted on an individual shaft 15 which is adapted to rock in suitable bearings 16 mounted on the frame 10. Secured to the shaft 15 are a pair of arms 17 to which the seat back 14 may be directly secured so that the back rocks with its shaft 15. In order to rock the shaft 15 and to hold it in adjusted position, a lever arm 20 may be secured thereto, this arm extending forwardly as indicated in Figure 3. The arm 20 at its forward end carries a suitable nut 21 which is internally threaded to receive the threaded portion of a screw 22. The nut 21, mounted in the end of the arm 20, is held thereby against rotation but is permitted to rock therein on an axis perpendicular to its bore for the purpose of maintaining alignment with the screw 22. The upper end of the screw is connected, as by a universal joint 23, to a short drive shaft 24. A spiral gear 25 is mounted on the shaft 24 to mesh with a companion spiral gear 26 which is mounted on a cross shaft 27. These shafts and gears may be enclosed and supported in a suitable housing 30 in such a manner as to hold the shafts against axial movement. To this end, the housing 30 may be in the form of a block with hollows therein for the gear wheels 25 and 26. As indicated in Figures 3 and 5, these gears fit within their respective hollows so that axial movement of their shafts is substantially prevented by engagement of the side faces of the gear wheels with inner surfaces of the block in which they are mounted.

The housing 30, the screw 22 and the arm 20 may all be enclosed in the arm rest 11 so that the back adjusting mechanism is entirely concealed except for an operating crank 31 which is provided with a handle 32 and is mounted on the cross shaft 27. The crank 31 may be adapted to fold at its middle as at 33 so that the handle 32 can enter a recess in the face of the casing 30. The outermost portion of the crank 31 is then substantially flush with the inner side face of the arm rest 11. Thus there is nothing projecting from the side of the arm rest to interfere with the movement of a person occupying the seat or to catch on the clothing.

When it is desired to adjust the angle of the back, the folding portion of the crank is swung outwardly to the dotted position shown in Figure 5, whereupon the crank may be easily operated to rotate the cross shaft 27, the drive shaft 24 and the screw 22. Since the drive shaft and screw are held against axial movement, rotation of the latter will result in an upward or downward travel of the nut 21 thereon, according to the direction of rotation. This travel of the nut 21 rocks the shaft 15 and the seat back 14 which is mounted thereon. Since the pitch of the worm or thread of the screw 22 is preferably small, the seat back remains in any angle to which it is adjusted, until changed from such angle by further manipulation of the operating crank.

If the seat is intended for use in a vehicle, it may be mounted on a suitable base 40 containing mechanism by which the seat may be swung around to face in the opposite direction. A suitable foot rest 41 may also be mounted on the rear edge of the bottom frame 10. As shown this foot rest may comprise a plate of generally rectangular shape pivotally mounted as at 42 on suitable brackets 43 extending from the frame 10. A tension spring 44 may be secured at one end to the foot rest 41 and to a suitable lug 45, as shown in Figure 2, the arrangement being such that when the foot rest is in its operative position the spring tends to hold it in such position. The rest, however, may be swung upwardly to the dotted position indicated, in which case the point of attachment of the spring swings above the pivot 42 so that the spring then tends to hold the foot rest in its raised or inoperative position.

It is evident that many modifications and changes may be made in the structure without departing from the spirit or scope of the invention.

We claim:

1. In a car seat, a seat frame, a rock-shaft supported thereon, a pair of spaced arms fixed to and rising upwardly from said shaft, a back for said seat secured between said arms to rock therewith, a lever arm extending forwardly from and fixed to said shaft, a nut mounted in said forwardly extending arm to rock on an axis perpendicular to its bore, a screw in threaded engagement with said nut, a rotatable drive shaft, means supported on said frame for holding said drive shaft against axial movement, a universal joint connecting said screw and drive shaft, a cross shaft supported on said frame, intermeshing spiral gears on said drive shaft and cross shaft, and an operating crank on said cross shaft.

2. In a car seat, a seat frame, spaced arms rockably mounted on said frame, a back for said seat secured between said arms to rock therewith, a lever arm forming a downward extension of one of said arms, a nut mounted in said downwardly extending arm to rock on an axis perpendicular to its bore, a screw in threaded engagement with said nut, a rotatable drive shaft mounted in said frame, a universal joint connecting said screw and drive shaft, a cross shaft on said frame, intermeshing spiral gears on said drive shaft and cross shaft, and an operating crank on said cross shaft.

3. In car seat, a seat frame, a back swingably mounted on said frame to rock on a horizontal axis, a lever arm rockable with said back on said axis, a nut mounted in said arm to rock on an axis perpendicular to its bore, a screw in threaded engagement with said nut, a drive shaft mounted in said frame, a universal joint connecting said screw and shaft, a cross shaft on said frame, driving means operably connecting said cross shaft and said drive shaft, and an operating crank on said cross shaft.

THOMAS D. OWLER.
JAMES V. CONWAY.